March 17, 1964     O. C. HOLDERER     3,124,852
INFLATABLE SEAL CONNECTION
Filed Jan. 5, 1962

Oscar C. Holderer,
INVENTOR.

United States Patent Office 3,124,852
Patented Mar. 17, 1964

3,124,852
INFLATABLE SEAL CONNECTION
Oscar C. Holderer, Huntsville, Ala., assignor to the United States of America as represented by the Secretary of the Army
Filed Jan. 5, 1962, Ser. No. 164,633
2 Claims. (Cl. 20—69)
(Granted under Title 35, U.S. Code (1952), sec. 266)

The invention described herein may be manufactured and used by or for the Government for governmental purposes without the payment of any royalty thereon.

This invention relates to pressure seals and more particularly to an inflatable sealing tube for completely sealing around doors or other closures opening into chambers containing a vacuum or being pressurized.

Inflatable seals comprising a rubber tube inserted in a retaining groove are widely used in experimental aerodynamic test facilities. For example, such seals are used around the periphery of access doors and along the contour of nozzles in wind tunnels. Inflatable seals can be advantageously used where a leak-proof seal must be established between two adjacent surfaces separated by a finite gap over which a given pressure differential is applied and where the sealing must be accomplished without requiring motion between the surfaces to be sealed (as is necessary for gaskets, O-rings, etc.). Further, the seal must be free to retract from sealing contact so as to permit a sliding motion between the two surfaces without restraint from the seal or damage to it. Obviously, static seals such as O-rings or gaskets cannot fill these requirements since in order to seal they require "squeeze" which presupposes a compressive motion between the surfaces forming the gap to be sealed. By the use of ordinary rubber tubing (such as latex surgical tubing) inflated by a fluid under pressure, usually air, the finite gap can be closed and sealed without compressive movement of the two surfaces.

A difficult problem inherent in the use of such inflatable seals is that sharp bends must be avoided to prevent pinching of the tubing. Also, the tubing must be held in the retaining groove by some means which does not obstruct continuity of sealing, and which promotes ease of replacement.

Another sealing problem exists where a continuous periphery, such as found with an access door, must be sealed. Here, the two terminal points of the inflatable sealing tube must still be connected to the pressure source, yet be arranged so as to form a continuous seal. Also, should the corners of the door be square, the seal must extend into the corners in order to complete the seal.

One object of this invention is to provide an inflatable seal for wind tunnel access doors and the like in which the ends of a continuous sealing tube are withdrawn from sealing contact so that the continuity of the seal along the periphery of the sealing contact is not interrupted at the point of seal connection.

Another object of this invention is to provide an inflatable seal for wind tunnel access doors and the like which is simple to mechanically connect or replace.

According to the present invention, the foregoing and other objects are attained by having an inflatable sealing tube disposed around the periphery of an access door in a manner to provide a continuous seal. A seal rettainer plate is disposed in a recess in the door and provides a means to withdraw the terminal points of the sealing tube in such a manner as to permit a continuous seal around the periphery of the door.

The invention will be more fully understood through the following detailed description taken in conjunction with the accompanying drawings wherein.

Figure 1:
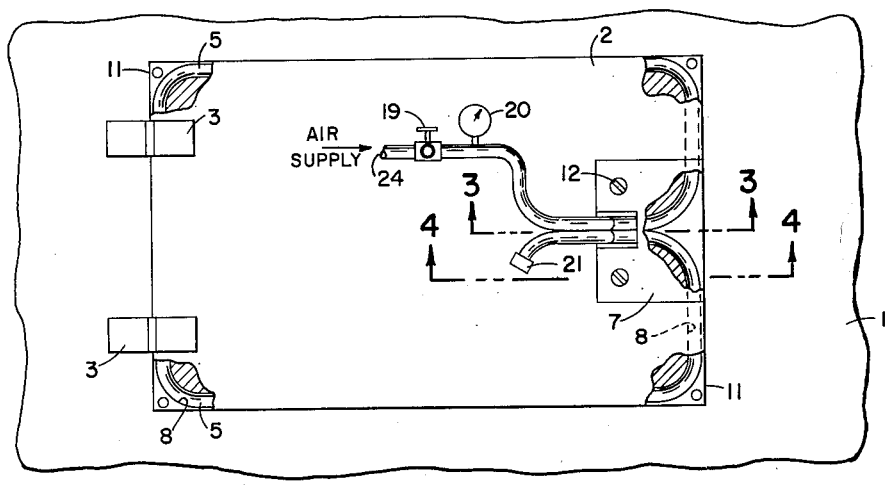
FIGURE 1 is an elevational view of the wall of a wind tunnel having an access door which utilizes the sealing device embodying the present invention.

Referring to FIGURE 1 the numeral 1 designates a portion of a wind tunnel which has a movable plate or door 2 mounted thereon. The door is pivotally mounted on hinges 3 to provide access to the inside of the wind tunnel. In order to insure an airtight engagement between the door and the wall of the wind tunnel an inflatable sealing tube 5 is disposed in a groove 8 around the outer peripheral edge of the door. A recess at one end of the door contains a seal retainer plate 7 which provides a protective housing for withdrawing the terminal ends of the sealing tube. Seal retainer 7 is removably mounted within the recess on the front of door 2 and is secured to the door by screws 12. A pressurized air supply 24 is shown at one of the terminal ends of the inflatable sealing tube 5. A 3-way control valve 19 and a pressure gage 20 are connected into tube 5 adjacent the air supply to regulate and indicate the amount of pressure applied to the inflatable tube. Since the other end of tube 5 is sealed by a plug 21, the 3-way valve allows for deflation of tube 5 when desired.

Figure 2:
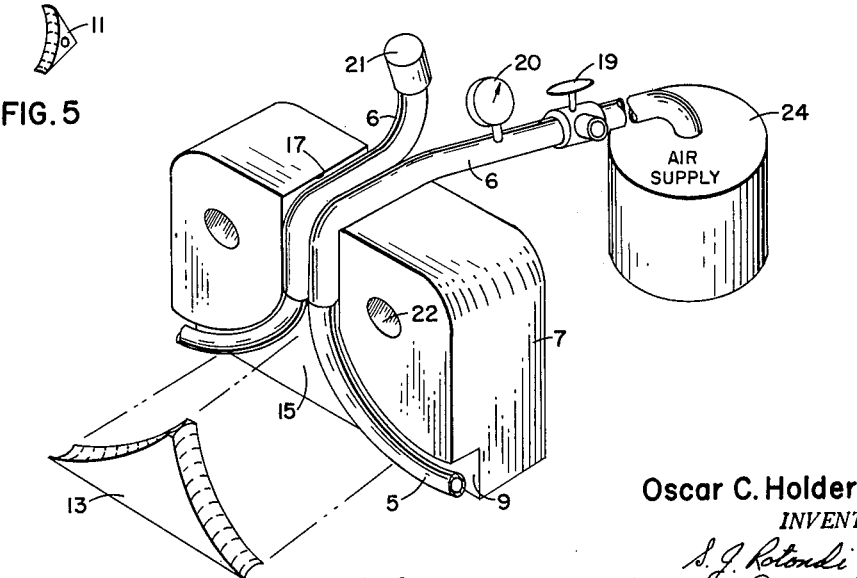
FIGURE 2 is a perspective view of a seal retainer plate used in this invention.

Referring to FIGURE 2 the terminal ends of the inflatable sealing tube are shown extending through the inner surfaces of retainer plate 7. These inner surfaces are designed to fit in the recess on door 2 and be secured thereto by screws extending through openings 22 so that grooves 9 and channel 17 will be formed by the recess between retainer plate 7 and door 2. A wedge-shaped void 15 lies between the inner face of retainer plate 7 and the junction point where the terminal ends of sealing tube 5 come together. A wedge-shaped plug 13 of suitable elastic material is placed in void 15 so that its converging sides come in contact with the curved portions of tube 5 shown on the side of retainer plate 7. The plug is primarily used to provide, at its base, a continuous sealing surface along the periphery of the door and also serves to protect the tube 5 from kinking as it is drawn up through retainer plate 7. Another wedge-shaped member, also made of a suitable elastic material, is used at the corner of the door to protect the sealing tube and provide a continuous sealing surface at the corner of the door. By inflating the sealing tube the pressure exerted against these plugs will cause them to seal at their respective junctions. The channel 17 on the inner edge of plate 7 provides a path for withdrawing the terminal ends of the sealing tube from the retainer plate. A metal tubing 6 encloses tube 5 to prevent excess chafing and damage to the sealing tube. One end of tube 5 is connected through gage 20 and control valve 19 to air supply 24 while the other end terminates in plug 21.

Figure 3:
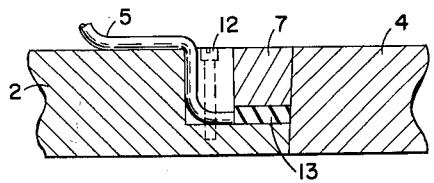
FIGURE 3 is a view taken along lines 3—3 of FIGURE 1.

Referring to FIGURE 3 the door is shown in a closed position against wall 4 of the wind tunnel. The edge of the door and the wall of the wind tunnel are shown engaging at a slight angle with respect to the horizontal surface of door 7 and wall 4. Wedge-shaped plug 13 is disposed in the wedge-shaped void of retainer plate 7. Metal tubing 6 which is described in FIGURE 2 and used with this invention is not shown in FIGURE 3 for reasons of clarity. The need for tubing 6 is quite apparent as shown by the curvature of tube 5 as it is led through retainer plate 7.

Figure 4:
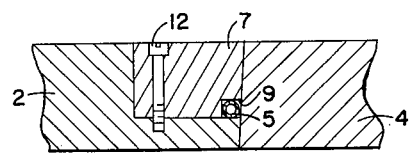
FIGURE 4 is a view taken along lines 4—4 of FIGURE 1.
Figure 5:
FIGURE 5 is a perspective view of a corner plug used in this invention.

Referring to FIGURE 4, a groove 9, which is the same size as groove 8 shown in FIGURE 1, is formed between retainer plate 7 and wall 4 with sealing tube 5 contained therein. FIGURE 5 shows another wedge-shaped member 11 which is made of a suitable elastic material and used to protect tube 5 as well as to provide a sealing means at the corners of door 2.

Obviously, numerous modifications and variations of the present invention are possible in the light of the above teachings. It is, therefore, to be understood that within the scope of the appended claims the invention may be practiced otherwise than as specifically described herein.

I claim:

1. In a closure for an access opening in the wall of a chamber, a door mounted in said opening for movement into substantially closing relation thereto, a groove extending around a major portion of the peripheral edge of said door, a resilient inflatable sealing tube mounted in said groove, said door having a recess disposed at one edge thereof, a seal retaining member secured in said recess and having, at each end of its edge lying along the peripheral edge of the door, a groove that connects with said groove extending around said door and that extends the latter groove into a wedge-shaped void that extends across a portion of the inner face of said member and that opens into a channel that extends across the central portion of that side of said member opposite the connecting groove, said connecting groove, void, and channel serving to house portions of said tube and for leading the terminal ends of said tube away from the peripheral edge of said door to a means for controlling the inflation of said tube, a wedge-shaped plug made of elastic material, said plug being smaller than said void and being mounted therein with its converging sides in contact with portions of said tube, and with the base of the wedge effecting the peripheral edge continuity of the seal formed by said tube in the area in which the terminal ends of said tube have been led away from the peripheral edge.

2. A closure as set forth in claim 1 wherein each of the ends of said tube are enclosed by a length of protective metal tubing which extends from a means for controlling the inflation of said tube and terminates in said channel, and said means for controlling the inflation of said tube comprises an air supply connected at one end of said tube, a valve connected at a point between said air supply and said retaining member to control the amount of air flowing to said tube and a plug connected to the other end of said tube to prevent the escape of air within said tube.

References Cited in the file of this patent

UNITED STATES PATENTS

| | | |
|---|---|---|
| 658,588 | Reynolds et al. | Sept. 25, 1900 |
| 2,691,460 | Barnebey | Oct. 12, 1954 |
| 2,757,225 | Dunn | July 31, 1956 |
| 2,927,609 | VanderLans | Mar. 8, 1960 |

FOREIGN PATENTS

| | | |
|---|---|---|
| 26,303 | Finland | Dec. 15, 1953 |
| 420,894 | Great Britain | 1935 |
| 703,820 | Great Britain | Feb. 10, 1954 |